United States Patent [19]
Takakura et al.

[11] Patent Number: 5,968,108
[45] Date of Patent: Oct. 19, 1999

[54] VEHICLE DIAGNOSING APPARATUS

[75] Inventors: Keiji Takakura, Saitama-ken; Hiroyuki Aiba, Tochigi-ken, both of Japan

[73] Assignee: Honda Giken Kogyo Kabushiki Kaisha, Tokyo, Japan

[21] Appl. No.: 09/116,470

[22] Filed: Jul. 16, 1998

[30] Foreign Application Priority Data

Jul. 18, 1997 [JP] Japan ................................. 9-194227

[51] Int. Cl.$^6$ ................................................. G01M 19/00
[52] U.S. Cl. ........................... 701/102; 73/116; 73/117.3; 73/118.1
[58] Field of Search .............................. 701/99, 101, 110, 701/111, 102; 73/116, 117.2, 117.3, 118.1

[56] References Cited

U.S. PATENT DOCUMENTS

| | | | |
|---|---|---|---|
| 4,817,418 | 4/1989 | Asami et al. | 73/118.1 |
| 5,452,446 | 9/1995 | Johnson | 395/600 |
| 5,594,646 | 1/1997 | Itoh et al. | 73/117.3 |
| 5,644,491 | 7/1997 | Fiske et al. | 701/101 |

FOREIGN PATENT DOCUMENTS 2256505   12/1992   United Kingdom .

Primary Examiner—George Dombroske
Attorney, Agent, or Firm—Armstrong, Westerman, Hattori, McLeland, & Naughton

[57] ABSTRACT

The cause for prolonged diagnosing time can be recognized on a real time basis. A vehicle diagnosing apparatus for diagnosing a vehicle is connected to an electronic control unit mounted on the vehicle. The diagnosing is performed by incorporating data, via the electronic control unit, from various sensors mounted on the vehicle. The apparatus has a timer for measuring the diagnosing time, and a display for indicating measured diagnosing time and judgement results of each of judging items. The judging time for each of the judging items is measured by the timer and the judgement results and the judging time are indicated on a real time basis by the display.

5 Claims, 5 Drawing Sheets

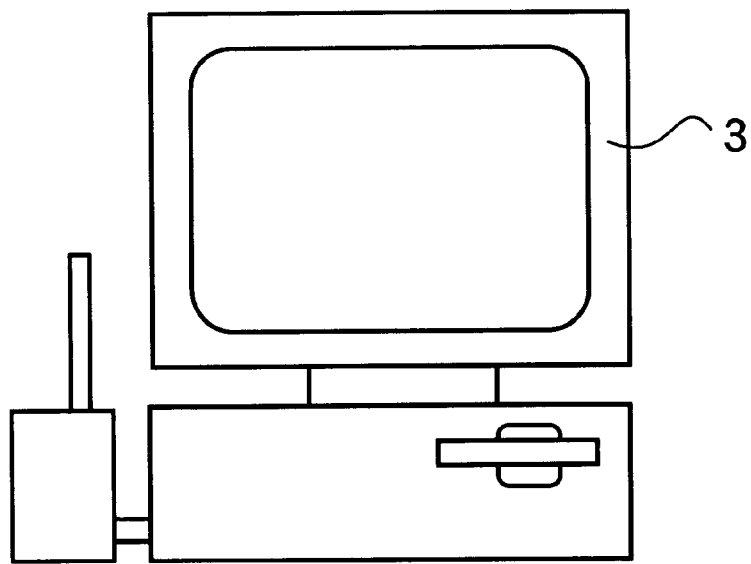
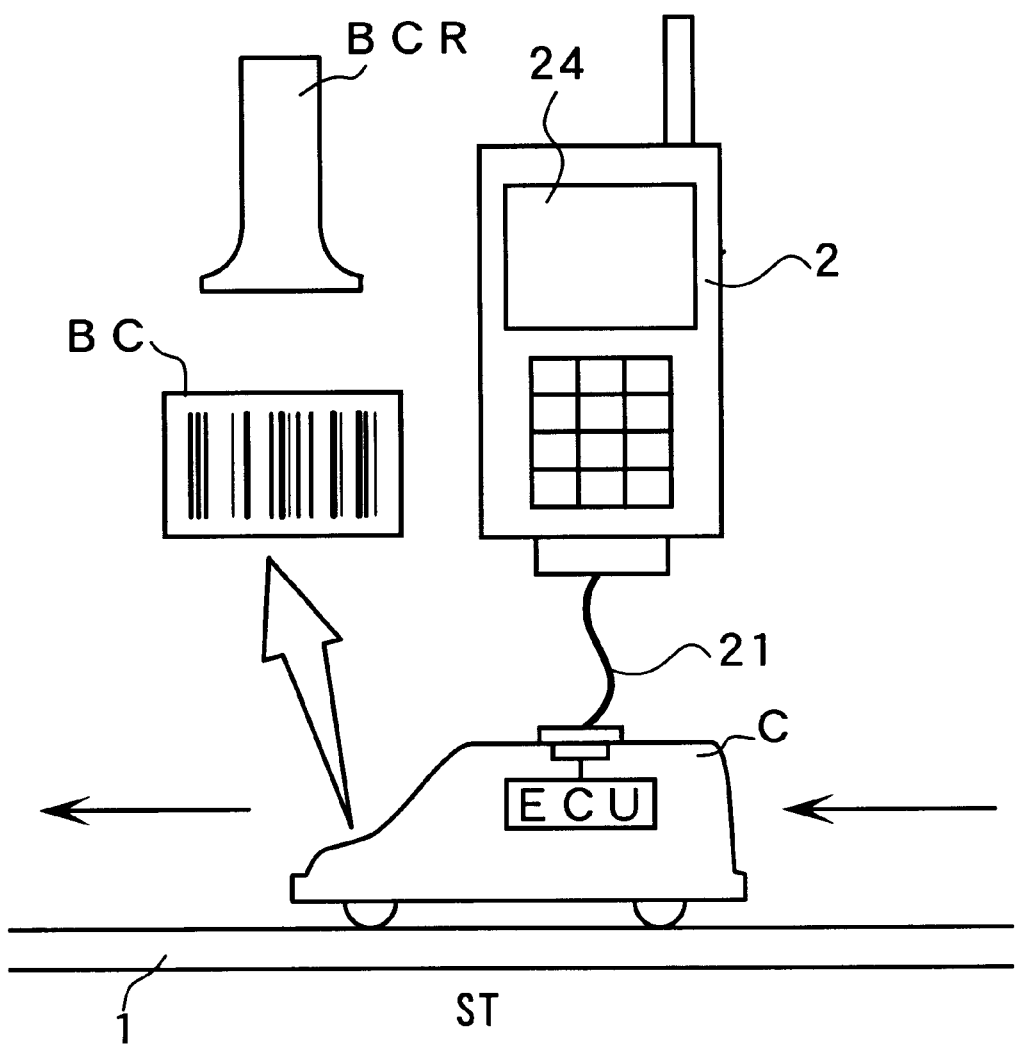

| ORDER | DIAGNOSING ITEM | RESULT | REQUIRED TIME (SEC) | AVERAGE TIME (SEC) | SHORTEST TIME (SEC) | LONGEST TIME (SEC) |
|---|---|---|---|---|---|---|
| 1 | IDLING TEST | OK | 10.2 | 9.7 | 9.4 | 11.4 |
| 2 | A/F CONTROL TEST | OK | 3.7 | 3.8 | 3.6 | 4.0 |
| 3 | EGR TEST | PERFORMING |  | 7.1 | 6.7 | 7.7 |
| 4 | SWITCHING TEST |  |  | 0.2 | 0.2 | 0.3 |
| 5 | VTEC TEST |  |  | 10.2 | 9.5 | 11.3 |

R1, R2, R3, R4, R5, R6, R7

GRAPH

| 7 | ......... | OK | 6.6 | ----- | ----- | ----- |
|---|---|---|---|---|---|---|
| 8 | ......... | OK | 1.5 | ----- | ----- | ----- |
|  | DIAGNOSING TIME |  | 43.6 | ----- | ----- | ----- |

RATIO OF TIME REQUIRED FOR EACH DIAGNOSING ITEM

GRAPH    MENU

VEHICLE DIAGNOSING APPARATUS

BACKGROUND OF THE INVENTION

1. Field of the Invention

The present invention relates to a vehicle diagnosing apparatus which diagnoses a vehicle, such as a motor vehicle. The vehicle diagnosing apparatus is connected to an electronic control unit which is mounted on the vehicle. The diagnosing is performed by incorporating the data from various sensors.

2. Description of the Related Art

As this kind of vehicle diagnosing apparatus, there has hitherto been known the following. Namely, data incorporated (or received) from an electronic control unit are processed according to a predetermined diagnosing program. Those results of judgement such as "OK" (acceptable) or "NG" (not acceptable) on judging items which are obtained by the processing are indicated or displayed on a display screen, on a piece of paper, or the like.

Further, there is also known the following apparatus in the Japanese Published Examined Patent Application No. 76723/1995. Namely, trouble data which are received from the electronic control unit while the vehicle is in trouble are indicated after converting them into trouble codes. Identification marks (abbreviations of sensors, or the like) corresponding to the trouble codes are also indicated to thereby locate or specify the position of the trouble, or the contents of the trouble.

The time required for diagnosing the vehicle varies from vehicle to vehicle. Therefore, in case the diagnosing of the vehicle is performed as a step of vehicle inspection works, a tact time is set in anticipating the possibility of requiring a long time for diagnosing. However, if the variations in the diagnosing time are large, there will be a spare (or superfluous) time in the diagnosing of most of the vehicles, which situation is not acceptable. As a solution, an effort is being made by locating and improving the cause for having taken up a particularly long time. The variations in the diagnosing time are thus minimized to shorten the diagnosing time.

However, in the former of the conventional diagnosing apparatuses as explained in the description of the related art, only the diagnosing results are indicated. Therefore, in order to specify the cause for the prolonged diagnosing time, it becomes necessary to analyze, at a later time, the data that have been incorporated into the diagnosing apparatus, with the result that the cause cannot be specified quickly.

Further, in the latter of the conventional diagnosing apparatuses as explained in the description of the related art, the trouble codes and the identification marks are indicated. However, these data are for the purpose of locating the position and the contents of the trouble. Therefore, in order to specify the cause for the elongated diagnosing time, it is also necessary to analyze the data at a later time.

In view of the above-described problems, the present invention has an object of providing a vehicle diagnosing apparatus in which the cause for the prolonged diagnosing time can be recognized on a real time basis.

SUMMARY OF THE INVENTION

In order to attain the above and other objects, the present invention is a vehicle diagnosing apparatus for diagnosing a vehicle by connection to an electronic control unit mounted on the vehicle, the diagnosing being performed by incorporating data, via the electronic control unit, from various sensors mounted on the vehicle, the apparatus comprising: measuring means for measuring a diagnosing time; indicating means for indicating the measured diagnosing time and judgement results of each of judging items; wherein each of the judging times to have been taken for processing each of the judging items is measured by the measuring means and the judgement results and the judging times are indicated on a real time basis by the indicating means.

When a longer time than usual is required in diagnosing, simply indicating the judgement results cannot reveal which of the judging items has taken a longer time. As a solution, according to the present invention, the judging time of each of the judging items is indicated on a real time basis, so that the cause for having taken up a longer time can be recognized easily.

Preferably, an arrangement is made to indicate simultaneously the judging time to be indicated on a real time basis as well as a longest time, a shortest time, and an average time of the judging times based on past data. Then, they can offer a material for considering the necessity for improvements and the priority of the improvements. Further, if a ratio of each of the judging times to a total of each of the judging times is indicated, the priority of the improvements can be judged more easily.

Preferably, the diagnosing apparatus further comprises: statistical processing means for statically processing data from the various sensors and data indicated on the indicating means; and memory means for storing said data and data to be obtained by the statistical processing. Then, the data which have been totalled and statistically analyzed for each lot of the vehicles can be utilized to grasp the data for each of the lots. An efficient diagnosing of the vehicles can be made in response to the characteristics and changes in each lot.

In the embodiment to be described hereinbelow, the measuring means is constituted by a timer 23, the indicating means is constituted by a display 24, and the statistical processing means and the memory means are constituted by a host computer 3.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 1 a schematic diagram to show one example of the vehicle diagnosing apparatus of the present invention;

DETAILED DESCRIPTION OF A PREFERRED EMBODIMENT

Figure 2:
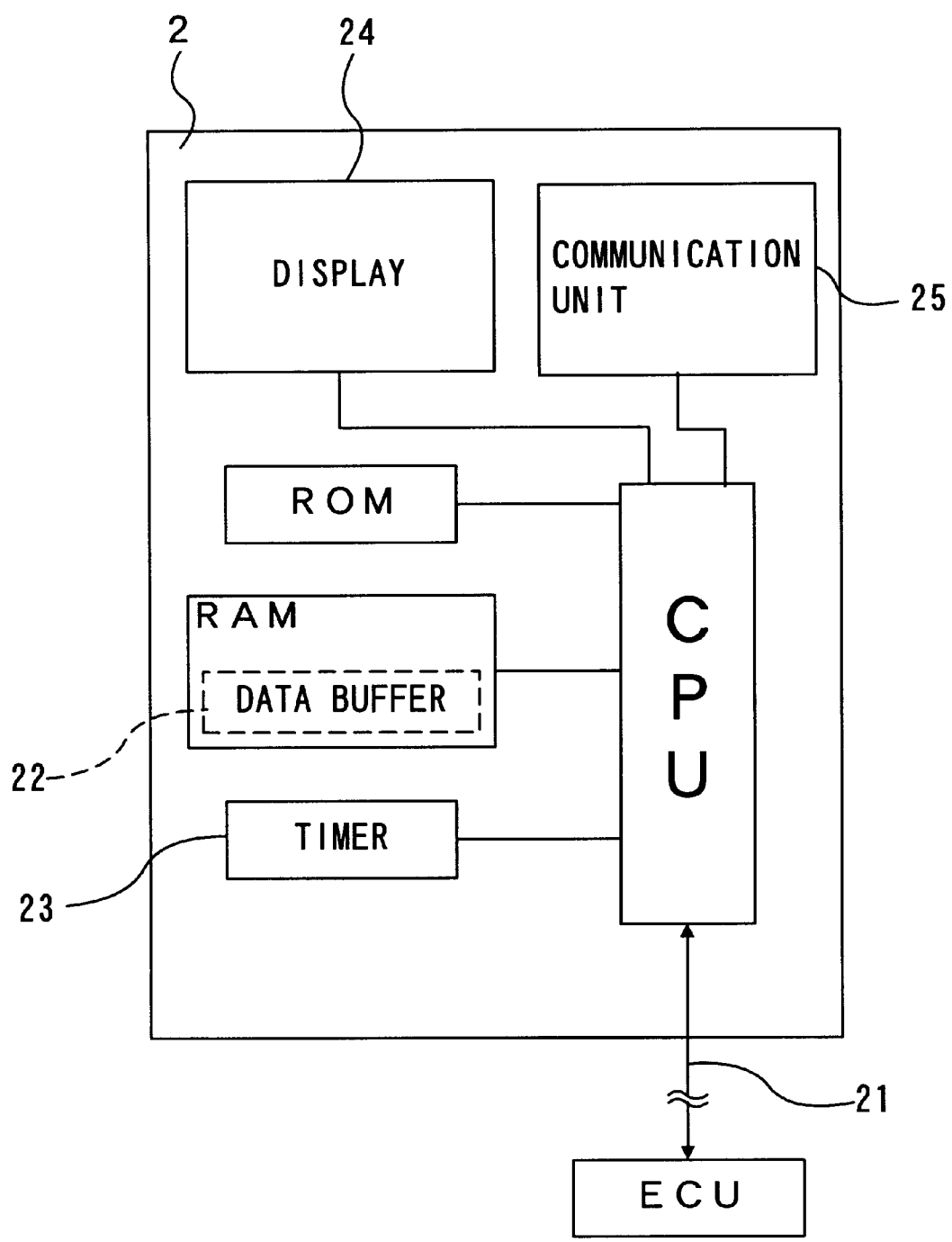
FIG. 2 is a block diagram to show the constitution of a diagnosing unit.

With reference to FIG. 1, reference numeral 1 denotes a line on which a vehicle C to be diagnosed is transported. Vehicles C on each of which is mounted an electronic control unit (ECU) are sequentially transported at a predetermined time interval. Each of the vehicles C has attached thereto a bar code BC which indicates the vehicle number which is peculiar to each. This bar code BC is read out by a bar code reader BCR. Reference numeral 2 denotes a portable type of diagnosing unit which can be connected to the ECU of the vehicle C via a cable 21. With reference to FIG. 2, the diagnosing unit 2 is provided with the following, namely: a central processing unit (CPU); a read-only memory (ROM); a random-access memory (RAM) in which is stored a diagnosing program and which also functions as a data buffer 22 for storing various data such as data signals, or the like, which are read from the ECU via the cable 21; a timer 23 which measures a diagnosing time; and a display 24 (e.g., a liquid crystal display, LCD) which displays or indicates the data stored in the data buffer 22. The diagnosing unit 2 is provided with a communication unit 25 which transmits the date signals, or the like, which are stored in the data buffer 22 so that bidirectional wireless communication can be performed between the diagnosing unit 2 and a host computer 3 which is disposed near the assembly line 1. When the data are received from the diagnosing unit 2, they are stored in the host computer 3 together with other data such as the vehicle number, or the like, which are transmitted from the bar code reader BCR.

Figure 3:
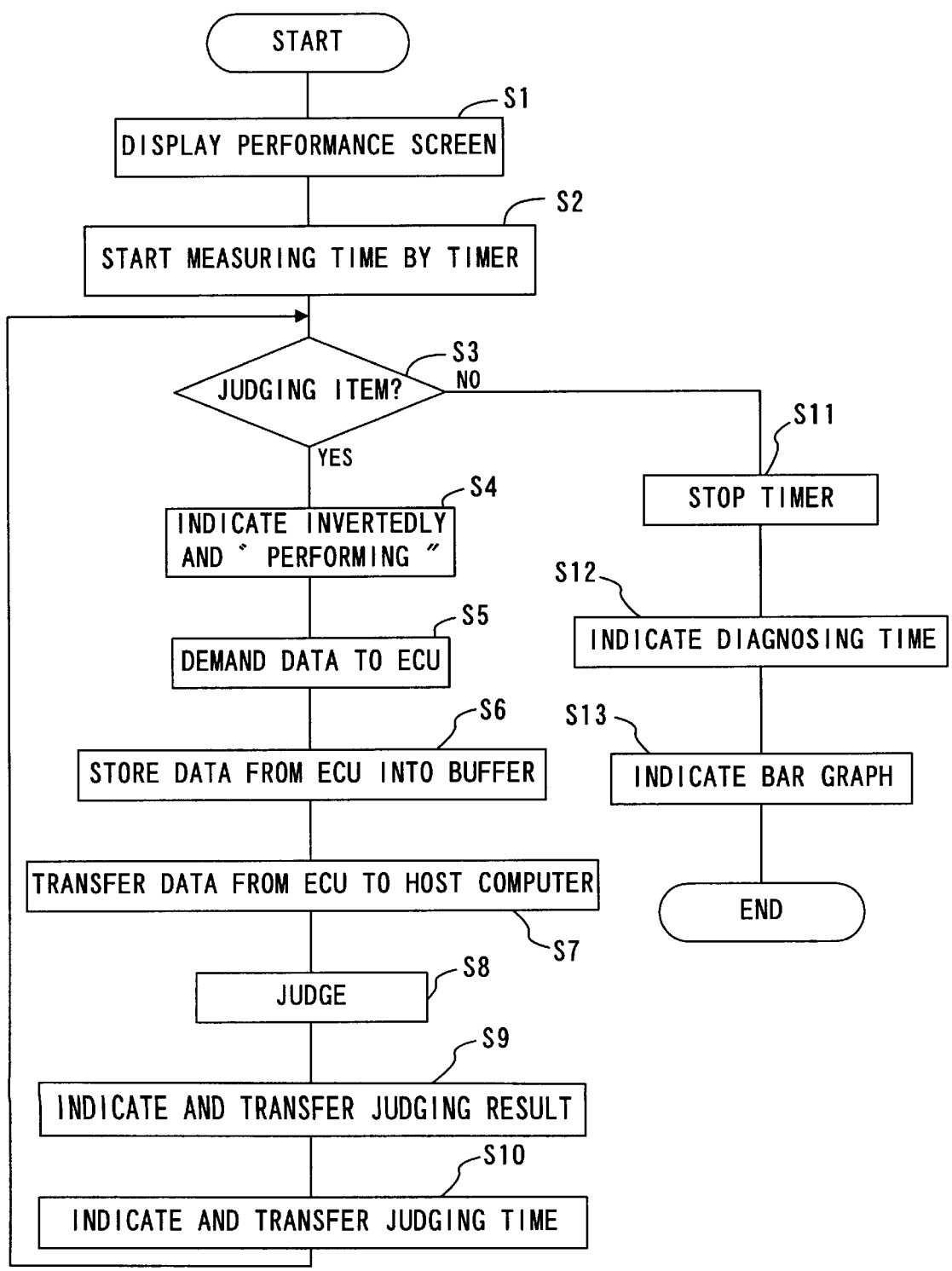
FIG. 3 is a flow chart to show the flow of diagnosing processing.

The operation for diagnosing the vehicle with the diagnosing apparatus of the above-described arrangement will now be explained with reference to the flow chart shown in FIG. 3.

Figures 4, 5:
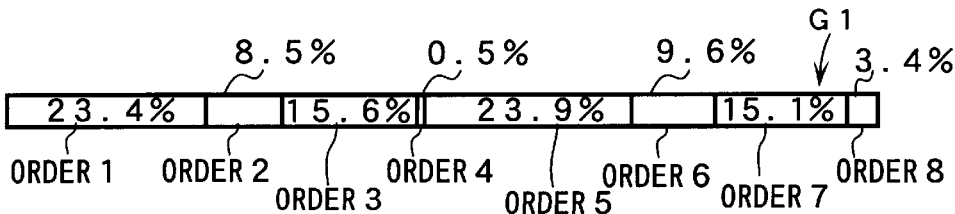
FIG. 4 is a diagram indicated on a display to show a performance screen in the process of diagnosing.
FIG. 5 is a diagram indicated on the display to show the screen when the diagnosing has been completed.

When the vehicle C has been transported by the line 1 into a predetermined station ST, the diagnosing unit 2 is connected to the ECU via the cable 21. Once the diagnosing unit 2 and the ECU have been brought into a state in which the communication can be made therebetween, diagnosing is started according to the diagnosing program. A performance screen which displays each of the judging items as shown in FIG. 4 is indicated (Si) on the display 24.

This performance screen has the following columns, i.e., a first column R1 which indicates the number of sequence or order of performance, a second column R2 which indicates the diagnosing contents of the judging items, a third column R3 which indicates the diagnosing results, a fourth column R4 which indicates the judging time to have been taken for processing each of the judging items, and fifth through seventh columns R5, R6, R7 which indicate an average time, shortest time and longest time of the judging times, respectively. The data on each of the judging items are indicated from top to bottom on each line in the order of judgement. In the above-described embodiment, the fifth column R5 indicates the average time. However, there may be indicated therein a difference between the measured judging time and the average time. Columns may be added so that indications can be made of both the average time and the above-described difference. Still furthermore, in case the display 24 of the portable type of diagnosing unit 2 is too small to indicate all the columns, they may also be indicated on another display to be separately provided.

Once the performance screen has been indicated, the counter value of the timer 23 is cleared to thereby start the measuring of the time by the timer 23 (S2). Then, a discrimination is made as to whether the judging items remain (S3). If there are some judging items left, a recognition is made as to which number of the judging items shall be processed for judgement. That line of the performance screen which coincides with the number in question is invertedly indicated, and an indication of "processing" (or "performing") is made on the third column R3 which indicates the diagnosing results (S4). FIG. 4 shows a state in which the third column is invertedly indicated, showing that EGR (exhaust gas recirculation) test is being performed. Subsequently, a demand for the data necessary for the judgement is made to the ECU (S5). When the demanded data have ben transmitted from the ECU, the data are once stored in the data buffer 22 (S6) and are transferred from a communication unit 25 to the host computer 3 (S7). Then, the data stored in the data buffer 22 are analyzed by the CPU to judge whether the corresponding judging items of the vehicle are normal or not (S8). The results of judgement are indicated on the display 24 and are also transmitted to the host computer 3 (S9). The counter value of the timer 23 is read out to indicate the judging time to have been taken for processing this judging item on the fourth column R4, and is also transmitted to the host computer 3 (S10). The judgement of the judging items will thus be completed. Thereafter, the program returns to the third step (S3) and the similar processing as mentioned hereinabove is performed to judge the next judging item. Once there is no more judging items (S3) as a result of repeating the above-described series of judging processing, the timer 23 is stopped (S11) and the counter value of the timer 23 is indicated on the display 24 as the diagnosing time, i.e., a total of each of the judging times (S12, see FIG. 5). Further, a bar graph G1 which shows in percentage the rate of the judging time of each judging item is indicated by making the diagnosing time to be 1 (S13, see FIG. 5).

Figure 6:
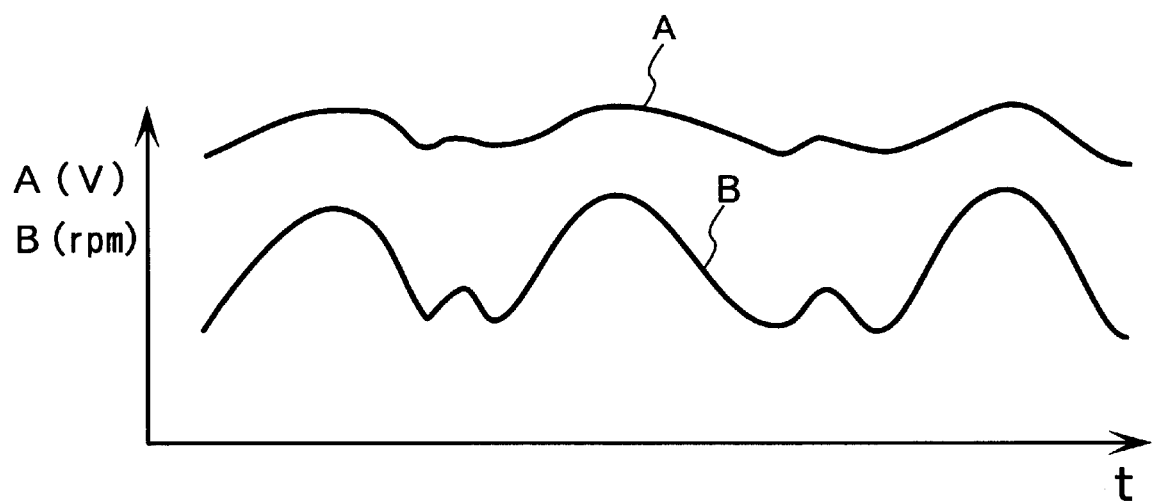
FIG. 6 is a graph to show the changes with the lapse of time of signals from an electronic control unit.

In the above-described embodiment, the following arrangement has been made. Namely, when a command indicated as on the lower portion of the screen is selected by using a signal inputting means (not illustrated) such as a key board, a mouse, or the like, a graph (see FIG. 6) is indicated on a real time basis to show the change with the lapse of time of the data signals transmitted from the ECU. In this arrangement, it becomes possible to know the changes in the output signals from the sensors or the equipment to be controlled, and to know the cause for prolonged judging time based on the wave form, or the like. FIG. 6 shows a screen in which are indicated a graph A which shows the changes in data signals from a throttle sensor at the time of idling test (first judging item) and a graph B which shows the data signals from an encoder which detects the revolution (or rotational) speed of the engine. By selecting the "RETURN" at the bottom of the screen, the screen can be returned to the performance screen.

Further, in the diagnosing apparatus of this embodiment, the following arrangement has been made. Namely, in the host computer 3, the data transmitted from the diagnosing unit 2 are totalled and statically processed for each lot of the vehicles and the ECU's or for each lot of the products such as particular sensors, or the like, so that the processed data can be indicated depending on the necessity. According to this arrangement, the data for each lot can be grasped and utilized for efficient diagnosing in response to the characteristics and changes from lot to lot.

In the present embodiment, the data are analyzed by the diagnosing unit to judge whether the vehicle is normal or not. It may also be so arranged that the data are analyzed and judged by the host computer and the judgement results are transmitted to, and indicated in, the diagnosing unit.

As explained hereinabove, according to the present invention, the processing conditions of the diagnosing apparatus such as the judging items, judging time, or the like, which are under processing can be recognized on a real time basis. Therefore, the work of analyzing the data to find out the cause for the prolonged judging time, and the work to be done thereafter for the purpose of improvement can be made easily.

It is readily apparent that the above-described vehicle diagnosing apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vehicle diagnosing apparatus for diagnosing a vehicle by connection to an electronic control unit mounted on a vehicle, said diagnosing being performed by incorporating data, via said electronic control unit, from various sensors mounted on the vehicle, said apparatus comprising;

measuring means for measuring each of a plurality of judging times corresponding to each of a plurality of judging items used in said diagnosing, each of the judging times representing a duration of time taken to process each of the respective judging items;

indicating means for indicating the measured judging times and judgement results of each of judging items on a real time basis.

2. A vehicle diagnosing apparatus according to claim 1, wherein said indicating means indicates simultaneously: the judging time on a real time basis; and a longest time, a shortest time, and an average time of the judging times based on past data.

3. A vehicle diagnosing apparatus according to claim 1 or 2, wherein said indicating means indicates a ratio of each of the judging times to a total of each of the judging times.

4. A vehicle diagnosing apparatus according to claim 1 or 2, further comprising: statistical processing means for statically processing data from said various sensors and data indicated on said indicating means; and memory means for storing said data and data to be obtained by said statistical processing.

5. A vehicle diagnosing apparatus according to claim 3, wherein said indicating means indicates a ratio of each of the judging times to a total of each of the judging times.

\* \* \* \* \*